United States Patent [19]

Vaisanen et al.

[11] Patent Number: 5,547,690
[45] Date of Patent: Aug. 20, 1996

[54] COMPOSITIONS AND METHOD FOR IMPROVING FLOUR DOUGH

[75] Inventors: Seppo Vaisanen; Sampsa Haarasilta, both of Kerava, Finland; Don Scott, Elk Grove, Ill.

[73] Assignee: Gist-Brocades, N.V., Delft, Netherlands

[21] Appl. No.: 291,623

[22] Filed: Aug. 17, 1994

Related U.S. Application Data

[63] Continuation-in-part of Ser. No. 153,539, Nov. 15, 1993, abandoned, which is a continuation of Ser. No. 976,287, Nov. 13, 1992, abandoned, which is a continuation of Ser. No. 496,072, Mar. 13, 1990, abandoned, which is a continuation-in-part of Ser. No. 136,003, Dec. 21, 1987, abandoned.

[51] Int. Cl.$^6$ ......................................................... A23B 5/00
[52] U.S. Cl. ................................ 426/10; 426/18; 426/19; 426/20; 426/62
[58] Field of Search ................................ 426/20, 10, 18, 426/19, 60, 62, 549

[56] References Cited

U.S. PATENT DOCUMENTS

| | | | |
|---|---|---|---|
| 2,783,150 | 2/1957 | Luther | 426/10 |
| 4,632,905 | 12/1986 | Starnes et al. | 435/189 |
| 4,894,340 | 1/1990 | Itammer et al. | |
| 4,990,343 | 2/1991 | Haarasilta et al. | 426/10 |

OTHER PUBLICATIONS

Young & Nimmo, Proceedings of the Biochemical Society, 1972, 1 p.
Motte et al, Biochemistry, vol. 26, Nov. 1987 pp. 7363–7371.
Don Scott, Enzymes in Food Processing, 1975, pp. 222–229, 2nd. Edition.
Kaufmann & Fennema, Cereal Chemistry, 64(3), 1987 pp. 172–176.
Novo's Handbook of Practical Biochnology, 1986, pp. 96–99.
Fluka Catalogue, 1 p.
Ullmann's Encyclopedia of Industrial Chemistry, Fifth, Completed Revised Edition, Vol A4, Germany, 1985, pp. 331–347.

*Primary Examiner*—Leslie Wong
*Attorney, Agent, or Firm*—Charles A. Muserlian; Bierman and Muserlian

[57] ABSTRACT

A method for improving the rheological properties of a flour dough through the use of an enzyme preparation which contains sulfhydryl oxidase and glucose oxidase.

11 Claims, 2 Drawing Sheets

COMPOSITIONS AND METHOD FOR IMPROVING FLOUR DOUGH

PRIOR APPLICATIONS

This application is a continuation-in-part of U.S. patent application Ser. No. 153,539 filed Nov. 15, 1993, now abandoned, which is a continuation of U.S. patent application Ser. No. 976,287 filed Nov. 13, 1992, now abandoned, which is a continuation of U.S. patent application Ser. No. 496,072 filed Mar. 13, 1990, now abandoned, which is a continuation-in-part of U.S. patent application Ser. No. 136,003 filed Dec. 21, 1987, now abandoned.

FIELD OF THE INVENTION

This invention relates to a method for improving the rheological properties of a flour dough which comprises combining flour, yeast, water and an effective amount of an enzyme preparation comprising sulfhydryl oxidase and glucose oxidase in a ratio of 0.1 to 10 units of sulfhydryl oxidase per unit of glucose oxidase and mixing said ingredients to form a suitable baking dough. The invention results in stronger doughs with improved rheological properties as well as a final baked product with improved texture.

BACKGROUND OF THE INVENTION

The "strength" or "weakness" of dough is an important aspect of baking. Flours with a low protein content are customarily characterized as "weak"; the gluten (the cohesive, extensible, rubbery mass which is formed by mixing flour and water) formed with weak flour will be very extensible under stress, but will not return to its original dimensions when the stress is removed. Flours with a high protein content are customarily characterized as "strong" and the gluten formed with strong flour will be less extensible than a weak flour, and stress which is applied during mixing will be restored without breakdown to a greater extent than a weak flour. Strong dough is generally preferred in most baking contexts because of the superior rheological and handling properties of the dough and the superior form and texture qualities of the final baked product made from the dough.

For example, stronger dough is generally more stable; the stability of dough is one of the most important (if not the most important) characteristics of baking dough.

American Association of Cereal Chemists Method 36-01A defines dough stability as "(a) the range of dough time over which a positive Response is obtained; and (b) that property of a rounded dough by which it resists flattening under its own weight over a course of time." Response is defined, by the same Method, as "the reaction of dough to a known and specific stimulus, substance or set of conditions, usually determined by baking it in comparison with a control."

Stable dough is particularly useful in large scale applications where it may be difficult to control all processing parameters; strong dough will exhibit a greater tolerance of, e.g. mixing time and proofing time, and still result in quality products. Less stable dough will exhibit less tolerance in this regard. Dough stability is also extremely important in retarded fermentation and frozen dough baking. Weakening of the dough in these contexts decreases the loaf volume of the bread and has other deleterious effects.

Bakers have long used dough "conditioners" to strengthen the dough. It is suggested that such conditioners, which consist primarily of non-specific oxidants such as bromates, peroxides, iodates and ascorbic acid, help form inter-protein bonds which strengthen the dough. However, non-specific oxidants have numerous drawbacks; in particular, they can have a negative effect on the organoleptic qualities of the final product and are relatively expensive in commercial quantities and, in the case of bromates, are not permitted in certain countries.

The use of enzymes as dough conditioners has been considered as an alternative to the non-specific oxidants. In particular, glucose oxidase has been used—sometimes in combination with other conditioners—to condition or "mature" flour. U.S. Pat. No. 2,783,150 (Luther) discusses the treatment of flour with glucose oxidase which allegedly can be used to form an improved dough with better handling properties and a high quality final baked product. The effects of glucose oxidase are somewhat contradictory. Water absorption of the dough is increased and in some instances the use of glucose oxidase has resulted in some improved dough quality, albeit at high levels uneconomical for commercial purposes. However, glucose oxidase, in some contexts, may actually impair dough rheology and has never been successfully used, per se, as a dough conditioner on a commercial scale.

It has also been suggested that the enzyme, sulfhydryl oxidase, could be used to strengthen dough. Sulfhydryl oxidase ("SHX") catalyzes—in the presence of oxygen—the conversion of thiol compounds to their corresponding disulfides according to the equation:

$$2RSH + O_2 \rightarrow RSSR + H_2O_2$$

The role played by sulfur containing reactive groups in wheat protein has not been fully defined but it is suggested that the reaction of free sulfhydryl groups to form disulfide bonds has an important role in the mixing and strength of dough. In particular, if disulfide bonds are formed between two protein chains, the resulting cross-linking of chains could strengthen the dough. Hence, SHX could be expected to strengthen dough by catalyzing the reaction of free sulfhydryl groups into inter-protein disulfide bonds.

However, Kaufmann et al., Cereal Chemistry, Vol. 64:3 (1987), evaluated bovine SHX's ability to strengthen wheat dough and concluded that it did not have any strengthening effect. The baking tests reported by Kaufmann et al. did not show any "noticeable" effect of SHX on loaf volume, and mixograph studies on SHX treated dough which did not show any "noticeable" effect on the time to reach a mixing peak or the extent of dough breakdown. Kaufmann et al also evaluated the effect of SHX on flour/buffer suspensions and concluded that SHX did not show any effect on the free-SH groups of flour. Kaufmann et al state that—for a number of possible reasons—SHX was not able to catalyze formation of disulfide bonds in the systems tested.

Therefore, one would not expect a combination of glucose oxidase and SHX to have an appreciable effect on dough strength, or on the quality of the baked product. Surprisingly, it has now been discovered that an enzyme preparation which includes both glucose oxidase and microbial SHX will appreciably strengthen dough and improves the form and texture of the final baked product. This action takes place at levels of glucose oxidase and SHX which makes enzyme treatment economically feasible on a commercial scale. The use of this enzyme preparation is particularly effective in retarded baking and frozen dough contexts, when the actual baking does not take place immediately following dough preparation.

OBJECTS OF INVENTION

It is an object of the invention to provide a novel method of improving the rheological properties of flour dough.

It is another object of the invention to provide novel compositions for improving rheological properties of flour dough.

These and other objects and advantages of the invention will become obvious from the following detailed description.

THE INVENTION

The present invention contemplates a method for improving rheological properties of flour dough by utilizing an enzyme preparation comprising sulfhydryl oxidase and glucose oxidase. In a preferred embodiment, a flour dough is formed by mixing flour, preferably wheat flour, together with water, yeast and an enzyme preparation comprising glucose oxidase and SHX to form a dough. The resulting dough exhibits improved strength and rheological properties. The enzyme preparation may, in addition, contain catalase. The enzyme preparation is preferably elaborated from microbial sources, including *Aspergillus niger*.

The present invention also contemplates a method for improving the rheological properties of dough designed to be cooled or frozen before baking. An enzyme preparation containing SHX and glucose oxidase, preferably in a SHX/GO ratio in the range of about 0.16 to about 0.66 based on Units of enzyme present, with a ratio of about 0.16 being particularly preferred.

The novel compositions of the invention for improving the rheological properties of flour dough are comprised of 0.1 to 10 units, preferably 0.1 to 1 unit, of sulfhydryl oxidase per unit of glucose oxidase. The more preferred ratio is about 0.35. Preferably, the enzyme preparation contains about 35 to about 800 units of sulfhydryl oxidase, more preferably about 80 units, per kilogram of flour.

The method of the present invention can also be used in combination with a non-specific oxidant such as ascorbic acid.

DETAILED DESCRIPTION OF THE PREFERRED EMBODIMENT

A. General

In order to demonstrate the effectiveness of a glucose oxidase-sulfhydryl oxidase enzyme preparation as a dough conditioner, varying levels of glucose oxidase and sulfhydryl oxidase were added to flour, water, yeast and salt, and mixed to make a suitable baking dough. The examples set forth in Tables I, II and III were made with a wheat flour (consisting of 95% Finnish wheat and 5% wheat from sources outside Finland). The flour used to make the doughs set forth in Table III were treated with ascorbic acid, a non-specific oxidant. For all samples set forth in Tables I and II, 1200 g of wheat were combined with Bakers yeast, 38 g of salt, 20 g of water and 728 g of varying amounts of an enzyme preparation purified from *Aspergillus niger* cells by filtration and having the following activity levels:

| SHX | 7.7 U/mg |
| glucose oxidase | 21.9 U/mg |
| catalase | 0.17 U/mg |

The term "Units" as used herein and in the appended claims means as follows:

SHX Unit: one sulfhydryl oxidase Unit is the amount of enzyme required to deplete 1 micromole of $O_2$ per minute from an assay mixture containing 8 millimoles of GSH and 40 millimoles of sodium acetate at pH 5.5 and a temperature of 25° C. [Young J. and Nimmo I., Biochem, J. (1972), 130:33.]

Glucose Oxidase Unit: 3 Units of glucose oxidase produce 1 ml of 0.05-N gluconic acid. [Scott D., J. Agr. Food Chem. (1953), 1:727.]

Catalase Unit: one catalase Unit decomposes 265 mg of hydrogen peroxide under the assay conditions of 25° C., 1.5% hydrogen peroxide and a pH of 7.0 when reacted to exhaustion. [Scott D. and Hammer F., Enzymologia (1960), 22:194.]

The flour, water, yeast, salt and enzyme preparation was mixed in a high speed dough mixer (Stephan Model FD 252 4 DS) for 71 seconds to develop a suitable baking dough. A control dough without the addition of any enzyme preparation—was also prepared. The effect of the enzyme preparation on the dough was measured by following standard methods according to the International Association of Cereal Chemists (ICC) and the American Association of Cereal Chemists (AACC): amylograph (ICC 126), farinograph (AACC 54-21) and extensigraph (AACC 54-10).

The amylograph, farinograph and extensigraph are methods—used by bakers worldwide—to evaluate the rheological and technological properties of dough. The amylograph determines the viscosity changes of flour-water suspensions during increasing temperatures (which are increased at a rate of 1.5° C./min.). At approximately 60° C., the mixture begins to gelatinize and typically reaches its maximum viscosity at about 75°–87° C., depending on the characteristics of the flour. The resulting amylograph curve illustrates the viscosity changes of flour; generally, flour with good baking properties exhibits higher viscosity at higher temperature for its maximum gelatinizing point.

AACC Method 22-10 defines the amylograph as follows: "the amylograph is a recording viscometer that may be used primarily to determine effect of α-amylase on viscosity of flour as a function of temperature. The high viscosity of the starch gel is counteracted by the action of α-amylase, which liquefies starch granules during heating of slurry. The amylograph value, or malt index, provides information on probable effect of malt α-amylase during baking process."

The extensigraph measures such properties as the dough's ability to retain gas evolved by yeast and the ability to withstand proofing. In effect, the extensigraph measures the relative strength of a particular dough. A strong dough will exhibit a higher and longer extensigraph curve than a weak dough.

AACC Method 54-10 defines the extensigraph as follows: "the extensigraph records a load-extension curve for test piece of dough stretched until it breaks. Characteristics of load-extension curves or extensigrams are used to assess general quality of flour and its responses to improving agents."

The farinograph method determines the water intake of a particular flour and the mixing tolerance of the resulting dough. Better baking flours, and dough, will exhibit higher farinograph values. If a particular flour shows relatively high water intake, and the mixing tolerance of the resulting dough is good, the farinograph curve shows retention of most if not all of the initial height over time. The machinability and baking quality of such a dough is likely to be excellent.

AACC Method 54-12 defines the farinograph as follows: "the farinograph measures and records resistance of a dough to mixing. It is used to evaluate absorption of flours and to determining stability and other characteristics of doughs during mixing."

Baking conditions used for baking bread from the dough prepared as above were as follows:

oven: normal hearth oven (Dahlen Delta Deck Oven, Model D-43) w/10 seconds steaming flour time: 30 minutes final proofing: 30 minutes/37° C./75% humidity baking time: 25 minutes at 220° C.

cooling time: 1 hour/20° C.

In the following examples, there are described several preferred embodiments to illustrate the invention. However, it should be understood that the invention is not intended to be limited to the specific embodiments.

TABLE I

Comparison of Rheological Properties of Doughs

| | Dough Sample | | | | |
|---|---|---|---|---|---|
| | 1 | 2 | 3 | 4 | 5 |
| ENZYME ADDITION | | | | | |
| SHX Units/kg flour | — | 38 | 77 | 154 | 770 |
| GO Units/kg flour | — | 110 | 219 | 438 | 2190 |
| CAT Units/kg flour | — | 2 | 4 | 7 | 40 |
| SHX/GO Unit ratio | — | 0.35 | 0.35 | 0.38 | 0.35 |
| GO/CAT Unit ratio | — | 55 | 55 | 55 | 55 |
| RESULTS | | | | | |
| Farinogram Water absorption % | 62 | 62 | 62 | 62 | 62 |
| Development of the dough/(measured in minutes) | 2 | 3 | 3.5 | 2 | 2 |
| Stability/(measured in minutes) | 3 | 12 | 23 | 19 | 2 |
| Softening/after 12 min Brabender Units (B.u.) | 50 | 30 | 10 | 10 | 120 |
| Resistance to Extens. Brabender Units (B.u.) | 420 | 450 | 580 | 610 | 980 |
| Extension, mm Brabender Units (B.u.) | 180 | 165 | 143 | 139 | 86 |
| Ratio resistance/extens B.u./mm | 2.4 | 2.7 | 4.1 | 4.4 | 11 |
| Maximum extension (B.u) | 620 | 640 | 760 | 720 | 980 |

Table I, above sets forth rheological properties for four doughs, a control dough (dough #1) and doughs conditioned with the enzyme preparation having different levels of SHX, glucose oxidase and catalase (doughs #2, #3, #4 and #5). The data demonstrates that dough mixed with an enzyme preparation containing glucose oxidase and SHX exhibit significantly improved rheological properties when compared with the control dough. In particular, dough #3 (23 minutes) and dough #4 (19 minutes) exhibit dramatic increases in stability compared to the control dough (3 minutes). The improved stability of the doughs treated with the enzyme preparation indicates that such doughs will exhibit better handling and machinability properties. The analysis data for the doughs treated with the enzyme preparation also suggests that these doughs were significantly strengthened. The resistance to extension, the maximum extension and the ratio of resistance to extension/extension all indicate that the treated doughs were significantly strengthened.

As noted, doughs with improved stability and strength generally also result in final baked products with improved qualities. Baking tests confirmed that doughs treated with the method of the present invention provided superior final products.

TABLE II

Results of Baking Tests

| | Loaf Sample | | |
|---|---|---|---|
| | 1 | 2 | 3 |
| Dough sample (Table 1) | 1 (control) | 3 | 4 |
| Dough consistency | | | |
| After mixing (B.u.) | 325 | 315 | 320 |
| After floor time (B.u.) | 285 | 290 | 300 |
| Loaf weight (g) | 370 | 370 | 370 |
| Loaf height (mm) | 76 | 79 | 76 |
| Loaf width (mm) | 172 | 171 | 173 |
| Loaf H/W ratio | 0.44 | 0.46 | 0.44 |
| Loaf volume (ml) | 1230 | 1340 | 1290 |
| Loaf Spec. Vol. (ml/kg) | 3310 | 3620 | 3490 |
| Loaf moisture (%) | 45.2 | 45.0 | 45.0 |

Table II sets forth baking results for loafs baked from doughs #1 (control), #3 and #4 referred to in Table I. The control dough (loaf #1) was not treated with any enzyme preparation and dough samples #3 and #4 (loaf samples #2 and #3 respectively) were treated with the enzyme preparation as set forth in Table I. The data from the baking tests set forth in Table II demonstrates that—compared to the control dough—doughs treated with the SHX/glucose oxidase enzyme preparation exhibited improved size and texture. In particular, loaf sample #2 (baked with dough sample #3 exhibit higher loaf volume (1340 ml. versus 1230 ml), higher specific volume (3620 ml/kg versus 3310 ml/kg) than the control sample. These height and width values demonstrate that loaf samples #2 and #3 were rounder and more symmetrical in shape, evidence of greater dough strength. In addition, the porosity of these loafs was more uniform meaning that the pores are the same size both near the crust and the center of the loafs.

Organoleptic comparison of the three loafs samples indicated that loaf samples #2 and #3 demonstrated improved texture properties compared to the control.

The baking results suggest that the present invention will help bakers achieve a larger loaf volume. In the commercial context, this means that bakers could probably use wheat with a lower protein content, which is cheaper, to achieve the desired loaf size and/or could utilize a smaller dough plug to achieve the desired loaf size; both possibilities could potentially result in substantial savings in material costs to the baker.

In order to determine the effect of varying levels of SHX and glucose oxidase in enzyme preparations used to treat baking doughs, the following enzyme samples were developed:

| Enzyme Sample A (prepared from *A. niger* cells) Activities: | |
| --- | --- |
| GO | 1.0 U/mg |
| SHX | 11.5 U/mg |
| CAT | — |
| Enzyme Sample B (prepared from *A. niger* cells) Activities: | |
| GO | 129 U/mg |
| SHX | 0.4 U/mg |
| CAT | 0.2 U/mg |
| Enzyme Sample C (prepared from *A. niger* cells) Activities: | |
| GO | 122 U/mg |
| SHX | 0.8 U/mg |
| CAT | 0.2 U/mg |

EXAMPLE 2: Dough Treated with Glucose Oxidase and with Glucose oxidase and SHX Tables III and IV below set forth data regarding the rheological properties of doughs prepared with Enzyme Samples A, B and C as well as control dough.

described above. Although this data suggests, as indicated by the prior art, that glucose oxidase alone can have a conditioning effect, relatively large (and uneconomical) quantities of glucose oxidase are required to achieve appreciable strengthening. The data also suggests that a glucose oxidase/SHX combination is the most efficient and economical preparation for dough conditioning.

EXAMPLE 3: Doughs Treated with GO and SHX

TABLE III

Rheological Properties of Dough Samples - Various Enzyme Levels

| Enzyme Sample | Activities | | | Water Absorp % | Dough Devel min | Dough Stabil min | Dough Soft B.u | Resist B.u | Ext min | Res/Ext ratio | Max B.u. |
| --- | --- | --- | --- | --- | --- | --- | --- | --- | --- | --- | --- |
| | GO | SHX | Catalase | | | | | | | | |
| Control | | | | 62 | 1.5 | 2.0 | 50 | 420 | 180 | 2.4 | 620 |
| Enzyme Sample A | | | | | | | | | | | |
| 1. | 4 | 38 | | 62 | 1.5 | 2.5 | 50 | 470 | 176 | 2.7 | 640 |
| 2. | 8 | 77 | | 62 | 1.5 | 2.0 | 60 | 470 | 174 | 2.7 | 640 |
| Enzyme Sample B | | | | | | | | | | | |
| 1. | 645 | 2 | 1 | 62 | 2 | 3.5 | 20 | 640 | 125 | 5.1 | 740 |
| 2. | 1290 | 4 | 2 | 62 | 2 | 15 | 10 | 640 | 126 | 5.1 | 760 |
| 3. | 2580 | 8 | 4 | 62 | 2 | 14.5 | 20 | 660 | 125 | 5.3 | 760 |
| 4. | 12900 | 40 | 20 | 62 | 2 | 2.5 | 120 | 980 | 95 | 10 | 980 |
| Enzyme Sample C | | | | | | | | | | | |
| 1. | 1290 | 8.0 | 20 | 62 | 2 | 3 | 30 | 720 | 129 | 5.6 | 900 |

The doughs set forth in Table III were prepared with "weak" Finnish wheat flour that had been treated with ascorbic acid (a non-specific oxidant) and prepared as

TABLE IV

RHEOLOGICAL PROPERTIES OF DOUGH SAMPLES

| Enzyme Preparations | Activities | | | Water Absorp % | Dough Devel min | Dough Stabil min | Dough Soft B.u | Resist B.u | Ext min | Res/Ext ratio | Max B.u. |
| --- | --- | --- | --- | --- | --- | --- | --- | --- | --- | --- | --- |
| | GO | SHX | Catalase | | | | | | | | |
| Amer. Bromated Flour (strong) | — | — | — | 60 | 2.5 | 10 | 40 | 330 | 261 | 1.3 | 620 |
| | 110 | 38 | 2 | 60 | 2 | 15 | 0 | 400 | 210 | 1.0 | 720 |
| | 219 | 77 | 4 | 60 | 2 | 15 | 0 | 670 | 175 | 3.8 | 900 |
| | 440 | 154 | 7 | 60 | 5 | 13 | 0 | 735 | 168 | 4.4 | 860 |
| Amer. Umbromated Flour (strong) | — | — | — | 61 | 2.5 | 8 | 40 | 340 | 224 | 1.5 | 640 |
| | 110 | 38 | 2 | 61 | 2.5 | 12 | 20 | 390 | 188 | 2.1 | 580 |
| | 219 | 77 | 4 | 61 | 2 | 15 | 0 | 525 | 178 | 3.0 | 720 |
| | 440 | 154 | 7 | 61 | 5 | 12 | 0 | 610 | 182 | 3.4 | 720 |
| Amer. (Weak) + | — | — | — | 57 | 1.5 | 4 | 90 | 280 | 172 | 1.6 | 390 |

TABLE IV-continued

RHEOLOGICAL PROPERTIES OF DOUGH SAMPLES

| Enzyme Preparations | Activities | | | Water Absorp % | Dough Devel min | Dough Stabil min | Dough Soft B.u | Resist B.u | Ext min | Res/Ext ratio | Max B.u. |
|---|---|---|---|---|---|---|---|---|---|---|---|
| | GO | SHX | Catalase | | | | | | | | |
| SHX (x2620) | 110 | 38 | 2 | 57 | 1.5 | 3 | 100 | 370 | 149 | 2.5 | 440 |
| | 219 | 77 | 4 | 57 | 1.5 | 3.5 | 70 | 430 | 137 | 3.1 | 480 |
| | 440 | 154 | 7 | 57 | 1.5 | 4 | 60 | 515 | 140 | 3.7 | 560 |

Table IV sets forth data for doughs prepared using different US flours, both strong and weak. Compared to the control samples, doughs prepared with these flours that were treated with an SHX/glucose oxidase enzyme preparation generally demonstrated increased stability and strength, as indicated by the resistance and extension data. The effect was greater in the case of the "strong" flours (bromated and unbromated) than for the unbromated "weak" flours.

Table V below sets forth data regarding rheological properties of doughs prepared with Finnish rye meal. A control dough with no enzyme treatment (sample #1) and dough samples with varying levels of SHX and glucose oxidase were prepared.

TABLE V

RHEOLOGICAL PROPERTIES OF RYE DOUGH* SAMPLES

| Enzyme Preparations | Activities | | | Water Absorp % | Dough Devel min | Dough Stabil min | Dough Soft B.u |
|---|---|---|---|---|---|---|---|
| | GO | SHX | Catalase | | | | |
| 0 - Control | | | | 75 | 3.5 | 3 | 20 |
| 1. | 110 | 38 | 2 | 73 | 3 | >12 | 0 |
| 2. | 219 | 77 | 4 | 73 | 3 | >12 | 0 |
| 3. | 440 | 154 | 7 | 74 | 3 | >12 | +10 |
| 4. | 645 | 2 | 1 | 74 | 3.5 | >12 | 0 |
| 5. | 1290 | 4 | 2 | 74 | 3.5 | >12 | +10 |
| 6. | 2580 | 8 | 4 | 75 | 3.5 | >12 | +10 |
| 7. | 12900 | 40 | 20 | 74 | 3.5 | 6 | 20 |

*Analysis of the rye meal samples:
Ash contents 1.74%
Falling number 125
Amylogram 260 B.U. at 66° C.

The data in Table V shows that an enzyme preparation with SHX/GO acts as a dough conditioner; the most efficient—and cost effective—preparations (samples 1–3) will probably be more effective in large scale contexts.

EXAMPLE 4: Treatment of Retarded Fermentation and Frozen Dough with Glucose Oxidase and SHX As noted earlier, dough stability in retarded fermentation and frozen dough baking is a problem in commercial contexts. The weakening of the dough decreases loaf volume of the final product and affects the texture and softness. This example demonstrates the strengthening effect of Glucose Oxidase and SHX on dough in retarded fermentation and frozen baking of white and "coffee" bread.

Raw materials for doughs prepared in the examples were as follows:
Dough made from regular white flour:
  moisture content: 14.1%
  falling number: 261 s
  gluten: 0.78% d.s.
  ash: 0.78% d.s.
  swelling index: 19 ml.
  ascorbic acid: 12 mg/kg flour
  water absorption: 63%
  mixing tolerance: 14.5 minutes (see enclosure 1)
  development of the dough: 2 minutes
Sulfhydryl oxidase preparation:
  SHX enzyme activity: 385 U/ml
  glucose oxidase activity: <1.4 U/ml
  catalase inactivated:
Glucose oxidase preparation (substantially free from sulfhydryl oxidase, SHX); enzyme addition levels when dosed 1% by weight of flour:
  glucose oxidase: 230 U/kg flour
  SHX: approximately: 0.8 U/kg flour

Methods

The rheological and baking properties of the following enzyme levels in retarded fermentation and frozen dough baking of white bread and coffee-bread doughs were studied. The rheological properties of the flour were also investigated at the same enzyme levels.

Dough mixing properties and dough (flour, water and salt) characteristics of white flour at various enzyme levels were measured by the farino- and extensigraphical methods as disclosed above. Additionally, the extensigrams for white roll doughs at various enzyme levels kept at refrigerator and freezer temperatures were measured.

Baking trials were carried out for white roll and coffee bread dough at various enzyme levels. Thirty white rolls (dough pieces) for every enzyme level were made which were divided into refrigerator and freezer storage.

Every baking trial was repeated and the results measured for ten individual products. White rolls and so-called "coffee breads" were baked according to the following recipes:
White rolls:
  1200 g white flour
  60 g shortening
  42 g yeast
  24 g salt
  780 ml water
  1800 g/30 white rolls=60 g/one white roll
  dough temperature 24° C.
  Each batch was divided into 30 rolls, each approximately weighing 60 g.
Coffee breads:
  1000 g white flour
  178 g sugar
  178 g shortening
  11 g salt
  57 g yeast
  430 ml water, (25° C.)
  dough temperature 24° C.
  Each batch was divided into 30 pieces each weighing approximately 60 g.

The dough was mixed in a mixer one minute at slow speed and five minutes at fast speed. The dough was immediately thereafter molded by the molder into the individual rolls or coffee breads. One half of the white rolls were stored (in refrigerator with adjustable temperature) at 5° C. overnight. They were warmed up and proofed at 34° C. for one hour. The other half of the rolls and coffee breads were kept in deep freezer (–20° C.) for two to three days. Before baking the products were thawed at room temperature for about three hours and proofed at 34° C. for one hour.

The properties of the dough were measured before and after storage:

The key for Tables VI through X is as follows:
(A) Control
(B) GO-preparate 1%
(C) GO 1% +SHX 38,5 u/kg
(D) GO 1% +SHX 77 u/kg

TABLE VI

Rheological Properties of Dough Samples
(White Rolls) Before Cold Storage

| Doughs | A | B | C | D | E |
|---|---|---|---|---|---|
| Dev. time/min | 2 | 2 | 2 | 2 | 2 |
| Stability/min | 18 | 17 | 17 | 17 | 17.5 |
| Resistance to extension/FU | 620 | 565 | 630 | 650 | 680 |
| Extension/mm | 167 | 171 | 182 | 175 | 164 |
| Ratio resistance/ extension/FU/mm | 3.7 | 3.3 | 3.5 | 3.7 | 4.1 |

TABLE VII

Rheological Properties of Dough Samples
(White Rolls) Measured After Storage at 5° C. Overnight

| Doughs | A | B | C | D |
|---|---|---|---|---|
| Resistance to extension/FU | 490 | 570 | 600 | 550 |
| Extension/mm | 118 | 131 | 123 | 127 |
| Ratio resistance/ extension/Fu/mm | 4.2 | 4.4 | 4.9 | 4.3 |

TABLE VIII

Rheological Properties of Dough Samples (White Rolls)
Measured After Storage at –20° C. for Three Days

| Doughs | A | B | C | D |
|---|---|---|---|---|
| Resistance to extension/FU | 410 | 530 | 620 | 545 |
| Extension/mm | 143 | 125 | 129 | 130 |
| Ratio resistance/ extension/FU/mm | 2.9 | 4.2 | 4.8 | 4.2 |

From this table, it is clear that, when keeping the concentration of glucose oxidase constant and increasing the level of SHX, the resistance to extension increased. The extension first increased and then decreased. A SHX/GO ratio of 0.17 already gave an improvement compared to 0.003. The "optimum level" depends on the flour used, the recipe and type of dough that is desirable for a specific application.

Extensigrams of control doughs show that its resistance to extension appeared to be smaller than that of the treated doughs after being kept in the freezer as well as in the refrigerator. The extensigraph measurements demonstrated that sulfhydryl oxidase has a strengthening effect on bread doughs after retarded fermentation (overnight cold storage) and after freezing and frozen dough baking.

The baking results for frozen white roll dough were as follows:

TABLE IX

Baking Results for Frozen Doughs (White Rolls)

| | 0 | 1% | 38.5 | 77 | 154 |
|---|---|---|---|---|---|
| Dough | A | B | C | D | E |
| Height/mm | 45.5 | 53 | 55 | 53.5 | 55.5 |
| Width/g | 84 | 83.5 | 84 | 85.5 | — |
| Weight/g | 51 | 52 | 50.5 | 51.5 | 51.5 |
| Specific volume/ml/g | 3.4 | 4.65 | 4.65 | 4.8 | 5.1 |
| Increase of spec. vol. (%) | | 37 | 37 | 41 | 50 |
| Quality of the dough | hard | soft | soft | soft | soft |
| Crumb softness* | 3 | 2 | 1 | 1 | 1 |
| Outlook profile | accept. | good | good | good | good |
| Crumb structure | open, uneven | uniform | uniform grain, small bubbles | | |

*Measured on a 1–5 scale with 1 being the softest.

The results are average values for two trial bakings (in both trials, ten white rolls per enzyme dosage were baked). No differences in flavor or taste between the different enzyme levels were observed. When the rolls were kept at +5° C. overnight (retarded fermentation), the rolls treated with SHX had softer crumb structure than the control rolls or the rolls treated only with Glucose Oxidase.

TABLE X

Baking Results for Frozen Dough (Coffee Bread)

| | 0 | 1% | 38.5 | 77 |
|---|---|---|---|---|
| Dough | A | B | C | D |
| Height/mm | 43 | 45.5 | 46.5 | 46 |
| Width/mm | 72.5 | 73.5 | 74.5 | 73.5 |
| Weight/g | 54 | 56 | 55.5 | 56 |
| Specific volume | 2.85 | 2.85 | 3.05 | 2.95 |

TABLE X-continued

Baking Results for Frozen Dough (Coffee Bread)

|  | 0 | 1% | 38.5 | 77 |
|---|---|---|---|---|
| (weight/ml/g) Increase of spec. vol. (%) | 13 | 0 | 7 | 3.5 |
| Quality of the dough | hard | soft | soft | soft |
| Crumb softness* | 4 | 3 | 2 | 1 |
| Crumb structure | harsh | smooth | smooth | smooth |

*Measured on a 1–5 scale with 1 being the softest.

No differences in flavor or taste between the breads were observed.

The results of this example demonstrate that the combination of glucose oxidase and SHX in retarded fermentation or frozen dough contexts has a significant effect on the quality of the dough and the final product. The use of SHX/glucose oxidase combinations with a SHX/glucose oxidase ratio of at least 0.16 strengthened the dough and increased the specific volume of the white rolls. For retarded fermentation (overnight cold storage), the optimum SHX/GO ratio was about 0.33. For frozen dough (deep freeze for two to three days), the optimum SHX/GO ratio was between 0.33 and 0.66.

The results of these experiments demonstrate that use of an enzyme preparation containing SHX and glucose oxidase appreciably and significantly improves the rheological properties of dough. The effect of the enzyme preparation is more pronounced with certain flours and may be enhanced by the presence of a dough conditioner such as ascorbic acid. It is believed that the two oxidative enzymes act synergistically, and that the combination of oxidative enzymes and non-specific oxidants also act synergistically.

EXAMPLE 5

Rheological properties of doughs.

In this example, the stability of doughs measured on a farinograph will be shown for SHX/GO ratios of 0.1 to 0.7 (see Table XI). The effect of the enzyme preparation on the dough was measured by the following standard methods according to the American Association of Cereal Chemistry (AACC 54-21).

Farinograph Interpretation

Figure 1:
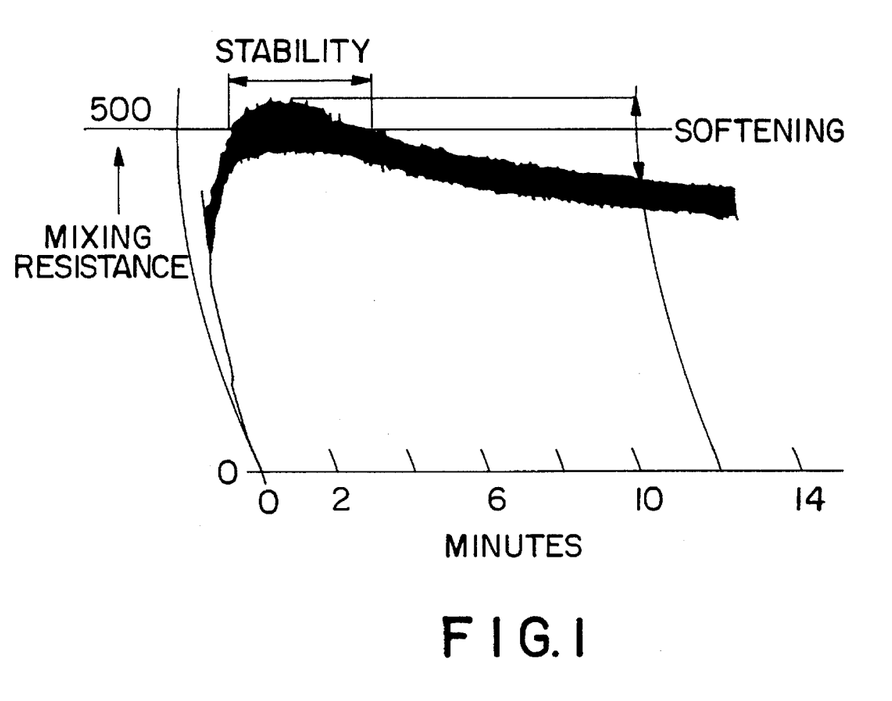
FIG. 1 is a graph of the farinograph curve of dough softening showing the decrease from the maximum and the height after 12 minutes.

The farinograph measures and records resistance of a dough during mixing. The water intake of a particular flour can be determined as well as the mixing tolerance of the resulting dough. Better baking flours and dough will exhibit higher farinograph values. If a particular flour shows relatively high water intake, and the mixing tolerance of the resulting dough is good, the farinograph curve shows retention of most, if not all, of the initial height over time. The time that the curve stays on the 500 line is the stability of the dough. Dough softening is the decrease of the farinograph curve between the maximum and the height after 12 minutes as can be seen from FIG. 1.

TABLE XI

COMPARISON OF RHEOLOGICAL PROPERTIES OF DOUGHS

|  | DOUGH SAMPLES | | |
|---|---|---|---|
|  | 1. | 2. | 3. |
| Enzyme addition |  |  |  |
| GO units/kg flour | 219 | 219 | 219 |
| SHX units/kg/flour | 19 | 38 | 154 |
| Results: |  |  |  |
| Farinogram Water absorption % | 62 | 62 | 63 |
| Stability of the dough (min) | 4 | 10 | 3.5 |
| Softening (12 min./B.U.) | 25 | 25 | 30 |
| Resistance to extension (B.U.) | 460 | 560 | 630 |
| Extension (mm) | 162 | 162 | 131 |
| Ratio resistance/extension | 2.8 | 3.5 | 4.8 |
| Max. extension (B.U.) | 640 | 730 | 740 |

PREPARATIONS USED IN RHEOLOGICAL STUDIES:

|  |  | U/mg |
|---|---|---|
| GO: | GO | 129 |
|  | SHX | 0.4 |
| SHX: | GO | 0.002 |
|  | SHX | 9 |

EXAMPLE 6

Figure 2A:
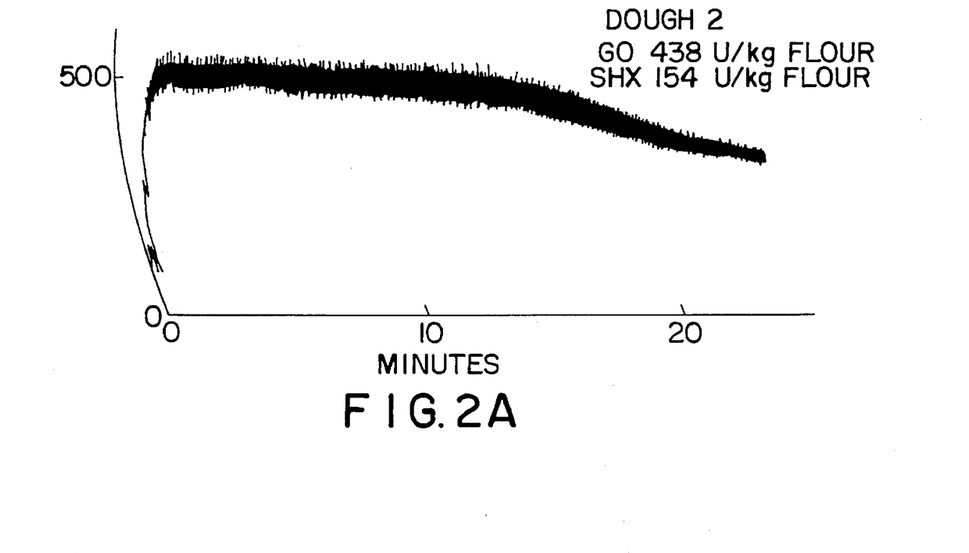
FIGS. 2A, 2B and 2C are farinographs of the doughs of Example 6.
Figure 2B:
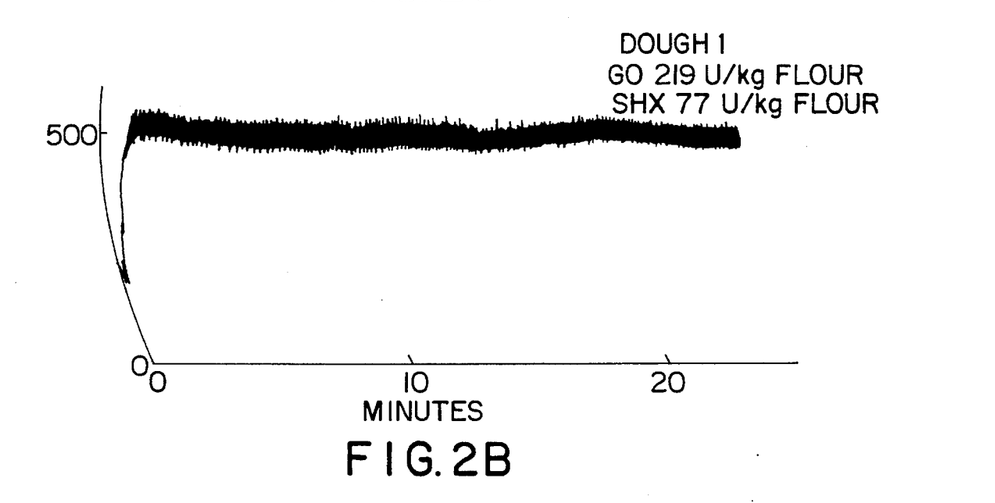
Figure 2C:
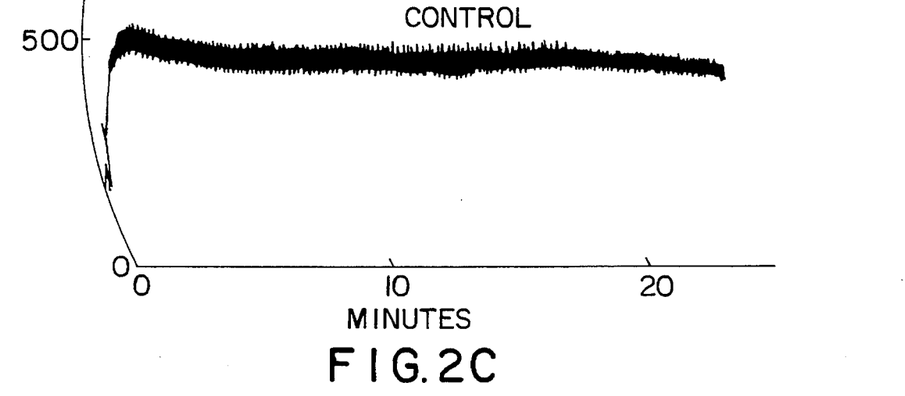

In the farinograph graphs of FIG. 2, it is seen that the optimum level (GO 19/SHX 77) gave a dough No. 1 whose mixing resistance did not decrease during a mixing time of 25 minutes. This finding was the reason for the conclusion that the optimum ratio of SHX/GO is 0.35. If the level of GO/SHX is higher (438/154), the dough No. 2 retains strength for 15 minutes. After this point, the dough's mixing resistance started to decrease when mixing was continued.

Various modifications of the compositions and method of the invention may be made without departing from the spirit or scope thereof and it is to be understood that the invention is intended to be limited only as defined in the appended claims.

What we claim is:

1. A method for improving the rheological properties of a flour dough which comprises combining flour, yeast and water with a microbial enzyme preparation consisting essentially of active quantities of sulfhydryl oxidase and glucose oxidase in a ratio of 0.1 to 10 units of sulfhydryl oxidase per unit of glucose oxidase wherein the amount of sulfhydryl oxidase and glucose oxidase present in said preparation are effective to improve dough strength and stability and mixing said ingredients to form a suitable baking dough.

2. The method of claim 1 wherein said enzyme preparation is derived from *Aspergillus niger*.

3. The method of claim 1 wherein the ratio is 0.1 to 1 unit of sulfhydryl oxidase per unit of glucose oxidase.

4. The method of claim 1 wherein the ratio of sulfhydryl oxidase to glucose oxidase present in said enzyme preparation is about 0.35, based on Units of enzyme present.

5. The method of claim 1 wherein the flour is fortified by non-specific dough conditioners.

6. The method of claim 5 wherein said conditioner is ascorbic acid.

7. A method for improving the rheological properties of flour dough designed to be cooled or frozen before baking which comprises combining flour, yeast and water with a rheological improving amount of an enzyme preparation consisting essentially of glucose oxidase and sulfhydryl oxidase in a ratio of 0.1 to 10 units of glucose oxidase per unit of sulfhydryl oxidase present in said preparation to improve dough strength and stability and mixing said ingredients to form a suitable baking dough.

8. The method of claim 7 wherein the ratio of sulfhydryl oxidase to glucose oxidase is 0.1 to 1.

9. The method of claim 8 wherein the ratio is about 0.35 to 1.

10. A composition for improving the rheological properties of a flour dough consisting essentially of 0.1 to 10 units of sulfhydryl oxidase per unit of glucose oxidase.

11. The composition of claim 10 comprising 0.1 to 1 unit of sulfhydryl oxidase per unit of glucose oxidase.

* * * * *